United States Patent
Tachibana et al.

[11] Patent Number: 5,094,909
[45] Date of Patent: Mar. 10, 1992

[54] ANTISTATIC LAYER

[75] Inventors: Noriki Tachibana; Yoichi Saito; Toshiaki Yamazaki, all of Hino, Japan

[73] Assignee: Konica Corporation, Tokyo, Japan

[21] Appl. No.: 534,488

[22] Filed: Jun. 6, 1990

[30] Foreign Application Priority Data

Jun. 12, 1989 [JP] Japan .................................. 1-150809

[51] Int. Cl.$^5$ .................. B32B 5/16; B32B 27/36; G03C 1/82
[52] U.S. Cl. .................................. 428/327; 428/336; 428/414; 428/483; 428/508; 428/522; 428/918; 428/922; 430/535
[58] Field of Search ............... 428/918, 922, 327, 336, 428/414, 483, 522, 508

[56] References Cited

U.S. PATENT DOCUMENTS

| | | | |
|---|---|---|---|
| 3,525,620 | 8/1970 | Nishio et al. | 96/84 |
| 3,668,748 | 5/1972 | Hardam | 426/240 |
| 4,192,683 | 3/1980 | Sakamoto et al. | 430/536 |
| 4,225,665 | 9/1980 | Schadt. III | 430/529 |
| 4,415,626 | 11/1983 | Hasenauer et al. | 428/922 |

FOREIGN PATENT DOCUMENTS

| | | |
|---|---|---|
| 707549 | 4/1954 | United Kingdom . |
| 1186699 | 4/1970 | United Kingdom . |
| 1548799 | 7/1979 | United Kingdom . |

Primary Examiner—P. C. Sluby
Attorney, Agent, or Firm—Jordan B. Bierman

[57] ABSTRACT

Disclosed is a plastic film comprising a support and an antistatic layer, provided thereon, comprising a reaction product of a water-soluble electroconductive polymer, hydrophobic polymer particles and a hardening agent, characterized in that the hydrophobic polymer particles are stabilized by a surfactant having at least five ethylene oxide chains.

18 Claims, No Drawings

ANTISTATIC LAYER

BACKGROUND OF THE INVENTION

This invention relates to an antistatic layer for plastic film, particularly to a light-sensitive silver halide photographic material excellent in antistatic ability.

Generally speaking, plastic films have strong chargeability, which gives many restrictions in uses in many examples. For example, in light-sensitive silver halide photographic materials, supports such as polyethylene terephthalate have been generally used, which are liable to be charged particularly at lower temperatures during winter season. In recent days, when high sensitivity photographic emulsions are coated at high speed, or light-sensitive materials of high sensitivity are subjected to exposure treatment through an automatic printer, antistatic countermeasures are particularly important.

When a light-sensitive material is charged, static marks may appear by its discharging, or a foreign matter such as dust, etc. may be attached, whereby pinholes may be generated to deteriorate markedly quality and workability is lowered extremely for correction thereof. For this reason, antistatic agents have been generally used in light-sensitive materials, and recently, fluorine-containing surfactants, cationic surfactants, amphoteric surfactants, surfactants or polymeric compounds containing polyethylene oxide groups, polymers containing sulfonic acid or phosphoric acid groups in the molecule, etc. have been employed.

Particularly, chargeability control with a fluorine-containing surfactant or electroconductivity improvement with an electroconductive polymer has been frequently used and, for example, in Japanese Unexamined Patent Publications Nos. 91165/1974 and 121523/1974, an example of applying an ion type polymer having dissociable group in the polymer main chain is disclosed.

However, in these prior art, the antistatic ability will be deteriorated to a great extent by developing processing. This may be considered to be due to the fact that the antistatic ability is low via the steps such as the developing step using an alkali, the acidic fixing step, the step of washing with water, etc. Therefore, in the case when printing is conducted by further use of a treated film as in printing light-sensitive material, etc., the problems such as pinhole generation, etc. by attachment of dust, etc. will ensue. For this reason, for example, Japanese Unexamined Patent Publications Nos. 84658/1980 and 174542/1986 propose an antistatic layer comprising a water-soluble electroconductive polymer having carboxyl group, a hydrophobic polymer having carboxyl group and a polyfunctional aziridine. According to this method, antistatic ability can remain after the treatment, but transparency is still insufficient. For this reason, the transparency was improved by use of additives. Further, the antistatic layer had drawbacks that the adhesiveness between the antistatic layer and a hydrophilic colloid layer coated thereon is poor to cause peeling off of the films during photographic processing.

SUMMARY OF THE INVENTION

To cope with the problems as described above, an object of the present invention is to provide an antistatic layer for plastic films excellent in transparency without haze, and another object is to provide a light-sensitive silver halide photographic material excellent in antistatic property.

The above object of the present invention can be accomplished by a plastic film comprising a support and an antistatic layer, provided thereon, comprising a reaction product of a water-soluble electroconductive polymer, hydrophobic polymer particles and a hardening agent, characterized in that said hydrophobic polymer particles are stabilized by a surfactant having at least five ethylene oxide chains.

DETAILED DESCRIPTION OF THE PREFERRED EMBODIMENTS

The water-soluble electroconductive polymer of the present invention can form a transparent layer by using it simply, but a slight change of the drying condition will cause cracks of the layer. In the structure of the present invention, the hydrophobic polymer particles are incorporated to inhibit the cracking, and the effect is great.

The water-soluble electroconductive polymer of the present invention may include polymers having at least one electroconductive group selected from sulfonic acid groups, sulfuric acid ester groups, quaternary ammonium salts, tertiary ammonium salts, carboxyl group and polyethylene oxide groups. Among these groups, preferred are sulfonic acid groups, sulfuric ester groups and quaternary ammonium salts. The electro-conductive groups is required to be contained by 5% by weight or more per one molecule of the polymer. In the water-soluble electroconductive polymer, at least one of hydroxy group, amino group, epoxy group, aziridine group, active methylene group, sulfinic acid group, aldehyde group and vinylsulfone group should be preferably contained. The polymer may have a molecular weight of 3,000 to 100,000 preferably 3,500 to 50,000.

In the following, exemplary compounds of the water-soluble electroconductive polymers to be used in the present invention are set forth, but the present invention is not limited by these examples at all.

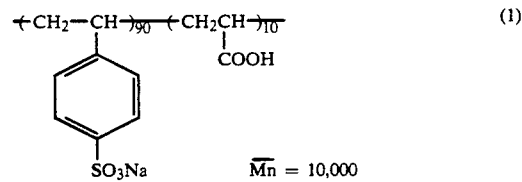
(1)

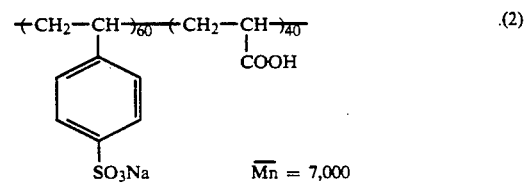
(2)

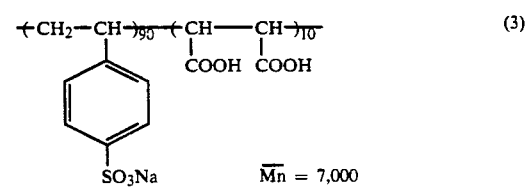
(3)

-continued

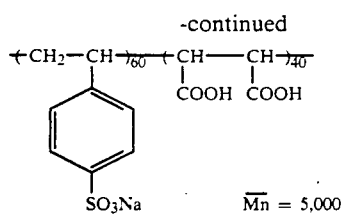 (4)

$\overline{Mn} = 5,000$

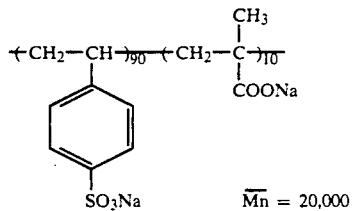 (5)

$\overline{Mn} = 20,000$

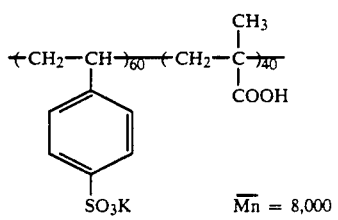 (6)

$\overline{Mn} = 8,000$

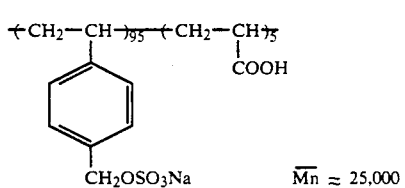 (7)

$\overline{Mn} \approx 25,000$

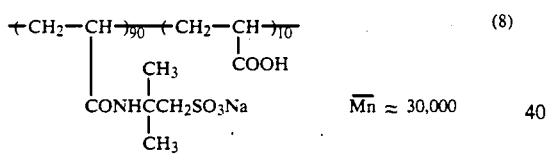 (8)

$\overline{Mn} \approx 30,000$

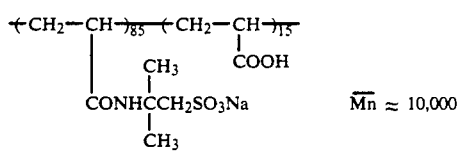 (9)

$\overline{Mn} = 10,000$

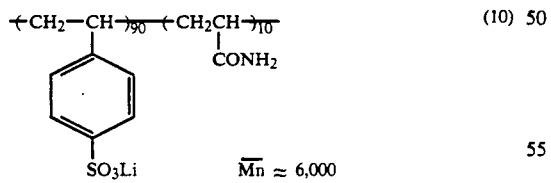 (10)

$\overline{Mn} \approx 6,000$

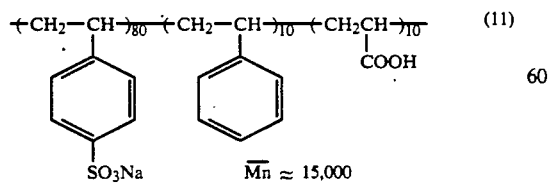 (11)

$\overline{Mn} \approx 15,000$

 (12)

Dextran sulfate  $\overline{Mn} = 500,000$
substitution degree: 3.0

-continued

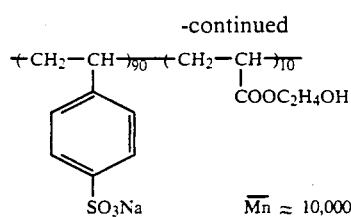 (13)

$\overline{Mn} \approx 10,000$

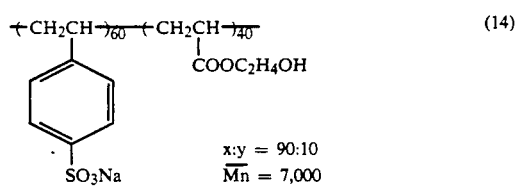 (14)

x:y = 90:10
$\overline{Mn} = 7,000$

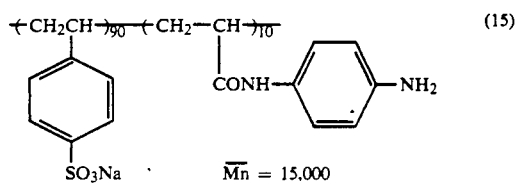 (15)

$\overline{Mn} = 15,000$

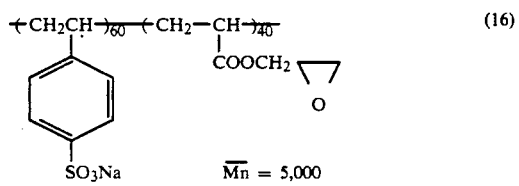 (16)

$\overline{Mn} = 5,000$

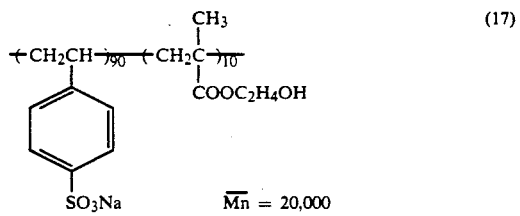 (17)

$\overline{Mn} = 20,000$

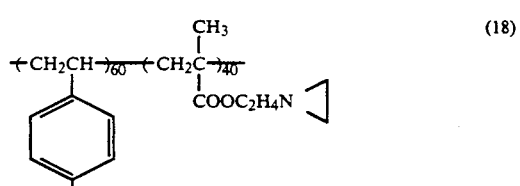 (18)

$\overline{Mn} = 8,000$

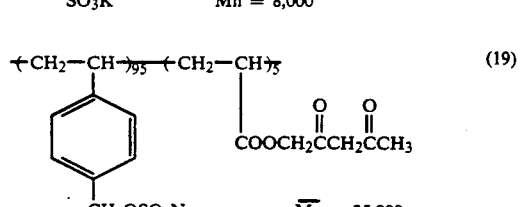 (19)

$\overline{Mn} \approx 25,000$

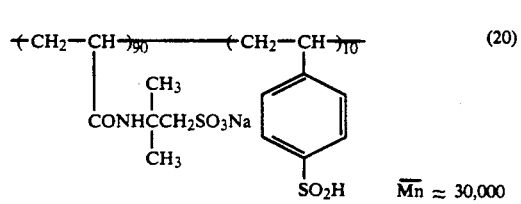 (20)

$\overline{Mn} \approx 30,000$

-continued $$\text{\textsuperscript{+}CH}_2-\text{CH}\text{\textsuperscript{-}}_{25}\text{\textsuperscript{+}}-\text{\textsuperscript{+}CH}_2-\text{CH}\text{\textsuperscript{-}}_{10}\text{\textsuperscript{+}CH}-\text{CH}\text{\textsuperscript{-}}_{15} \quad (21)$$

with substituents $CH_3$, $CONHC(CH_3)CH_2SO_3Na$, $CHO$, $COOH$, $COOH$
$\overline{Mn} \approx 10{,}000$ $$\text{\textsuperscript{+}CH}_2-\text{CH}\text{\textsuperscript{-}}_{90}\text{\textsuperscript{+}CH}_2-\text{CH}\text{\textsuperscript{-}}_{10}\text{\textsuperscript{+}}- \quad (22)$$

with phenyl-$SO_3Li$ and $CONH$-phenyl-$SO_2CH=CH_2$
$\overline{Mn} \approx 6{,}000$ $$\text{\textsuperscript{+}CH}_2-\text{CH}\text{\textsuperscript{-}}_{80}\text{\textsuperscript{+}CH}_2-\text{CH}\text{\textsuperscript{-}}_{10}\text{\textsuperscript{+}CH}_2\text{CH}\text{\textsuperscript{-}}_{10} \quad (23)$$

with phenyl-$SO_3Na$, $COOC_2H_4OH$, $COOCH_2$-(furan)
$\overline{Mn} = 15{,}000$ Dextran sulfate    (24)
substitution degree: 2.0, $\overline{Mn} = 100{,}000$ $$\text{\textsuperscript{+}CH}_2-\text{CH}\text{\textsuperscript{-}}_{60}\text{\textsuperscript{+}CH}_2-\text{CH}\text{\textsuperscript{-}}_{40} \quad (25)$$

with phenyl-$SO_3Na$ and $CONHCH_2OC_4H_9$
$\overline{Mn} \approx 10{,}000$

In the above formulae (1) to (25), $\overline{Mn}$ represents an average molecular weight (in the present specification, average molecular weight refers to number average molecular weight), which is a measured value according to GPC represented by polyethylene glycol.

The hydrophobic polymer particles to be contained in the antistatic layer containing the water-soluble electroconductive polymer of the present invention is composed of the so-called latex form substantially insoluble in water. The hydrophobic polymer can be obtained by polymerization of monomers according to any desired combination from among styrene, styrene derivatives, alkyl acrylates, alkyl methacrylates, olefin derivatives, halogenated ethylene derivatives, acrylamide derivatives, methacrylamide derivatives, vinyl ester derivatives, acrylonitrile, etc. Particularly, styrene derivatives, alkyl acrylates and alkyl methacrylates should be preferably contained in amounts of at least 30 mole %, particularly 50 mole % or more.

The hydrophobic polymer can be made into a latex state by two methods, i.e. a method in which emulsification polymerization of a monomer is carried out, and a method in which solid polymer is dissolved into a low boiling point solvent to by finely dispersed followed by evaporation of the solvent. The method of emulsification polymerization is preferable because uniform fine particles can be obtained.

The characteristic feature of the present invention resides on carrying out stabilization by use of a surfactant when the hydrophobic polymer is made into a latex state.

As the surfactant having at least five ethylene oxide chains, the compounds represented by the following formulae (I), (II), (III), (IV), (V) and (VI) are included.

Formula (I)

$$R_1\text{-(phenyl with }R_2\text{)}-O_{l_1}(CH_2CH_2O)_{n_1}(CH_2)_{m_1}SO_3M_1$$

(wherein $R_1$ represents an alkyl group having 1 to 18 carbon atoms, $R_2$ represents a hydrogen atom or an alkyl group having 1 to 18 carbon atoms, $l_1$ represents 0 or 1, $n_1$ represents an integer of 5 to 50, $m_1$ represents an integer of 0 to 4, and $M_1$ represents a cation of an alkali metal ion, alkaline earth metal ion, ammonium ion or quarternary ammonium salt ion), Formula (II)

$$R_3\text{-(C=O)}_{l_2}-O\text{-}(CH_2CH_2O)_{n_2}(CH_2)_{m_2}SO_3M_2$$

(wherein $R_3$ represents an alkyl group or an alkenyl group having 6 to 20 carbon atoms $l_2$ represents 0 or 1, $n_2$ represents an integer of 5 to 50, $m_2$ represents an integer of 0 to 4, and $M_2$ has the same meaning as $M_1$ of Formula (I)).

Exemplary anionic surfactants:

| | |
|---|---|
| $C_9H_{19}$-phenyl-$O(CH_2CH_2O)_{20}SO_3Na$ | a-1 |
| $C_9H_{19}$-phenyl-$O(CH_2CH_2O)_{5}(CH_2)_{3}SO_3Na$ | a-2 |
| $C_{12}H_{25}$-phenyl-$O(CH_2CH_2O)_{20}(CH_2)_{3}SO_3Na$ | a-3 |
| $C_{12}H_{25}-O(CH_2CH_2O)_{5}(CH_2)_{3}SO_3Na$ | a-4 |
| $C_{16}H_{33}-O(CH_2CH_2O)_{6}(CH_2)_{4}SO_3Na$ | a-5 |
| $C_{12}H_{25}O(CH_2CH_2O)_{6}SO_3Na$ | a-6 |
| $C_{11}H_{23}-C(=O)-O(CH_2CH_2O)_{5}SO_3Na$ | a-7 |
| $C_{16}H_{33}-C(=O)-O(CH_2CH_2O)_{10}(CH_2)_{3}SO_3Na$ | a-8 |

Formula (III)

$$R_4\text{-(J)}_{l_3}-O\text{-}(CH_2CH_2O)_{n_3}-H$$

(wherein $R_4$ represents an alkyl group or an alkenyl group having 6 to 20 carbon atoms, J represents $$-\overset{O}{\underset{\|}{C}}-\text{ or }-\text{phenyl}-,$$

$l_3$ represents 0 or 1, and $n_3$ represents an integer of 5 to 40)

Formula (IV)

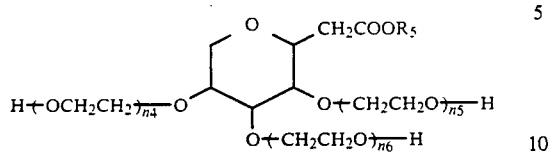

(wherein $R_5$ represents an alkyl group or an alkenyl group having 8 to 25 carbon atoms and the total of $n_4$, $n_5$ and $n_6$ represents an integer of 5 to 100, with the proviso that at least one of $n_4$, $n_5$ and $n_6$ is 5 or more)

Formula (V)

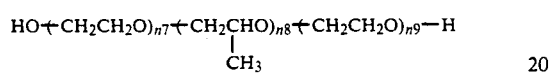

(wherein the total of $n_7$ and $n_9$ denotes an integer of 5 to 100, and $n_8$ denotes an integer of 1 to 50, with the proviso that at least one of $n_7$ and $n_9$ is 5 or more), Formula (VI)

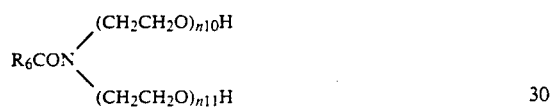

(wherein $R_6$ represents an alkyl group or an alkenyl group having 6 to 20 carbon atoms, the total of $n_{10}$ and $n_{11}$ represents an integer of 5 to 100, with the proviso that at least one of $n_{10}$ and $n_{11}$ is 5 or more)

Specific examples of nonionic surfactant represented by Formulae (III) to (VI) are shown below.

Exemplary nonionic surfactants:

 n-1
 n-2
 n-3

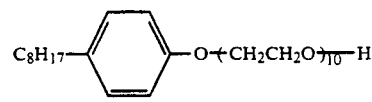 n-4

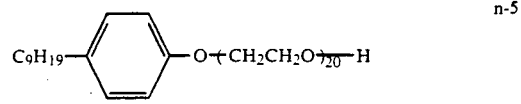 n-5

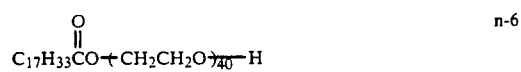 n-6

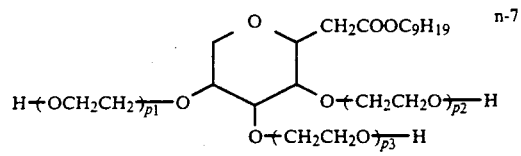 n-7

$p_1 + p_2 + p_3 = 20$

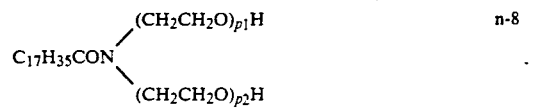 n-8

$p_1 + p_2 = 12$

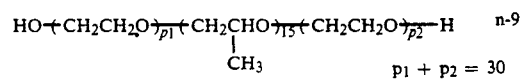 n-9

$p_1 + p_2 = 30$

The amount of the surfactant of the present invention employed is preferably not less than 0.5% by weight and not more than 20% by weight, further preferably not less than 1% by weight and not more than 10% by weight to the polymer.

The dry thickness of the electroconductive layer (antistatic layer) is 0.01 μm or more, preferably 0.05 to 0.5 μm. The average particle size of the hydrophobic polymer particles is usually 0.005 to 0.5 μm, preferably 0.025 to 0.25 μm, particularly preferably one third of the thickness of the layer, i.e. 0.03 to 0.2 μm.

The molecular weight of the hydrophobic polymer may be 3,000 or higher, and there is no substantial difference depending on the molecular weight.

Specific examples of the hydrophobic polymer are shown below with the examples of the surfactants used together. (Surfactant, unit is wt % to a polymer)

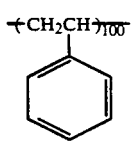 1.

a-2  5%

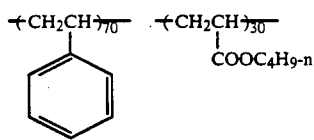 2.

a-3  5%
n-1  5%

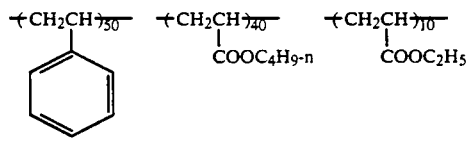 3.

n-5  10%

-continued
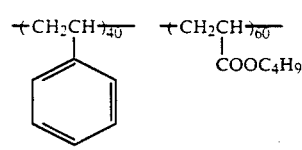
4.
a-8  3%
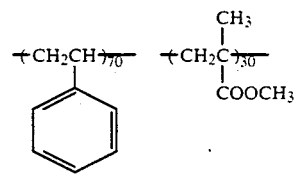
5.
a-7  15%
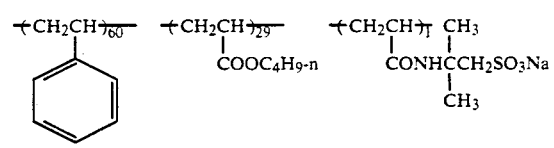
6.
a-4  3%
n-4  5%
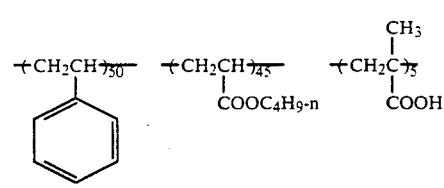
7.
n-5  5%
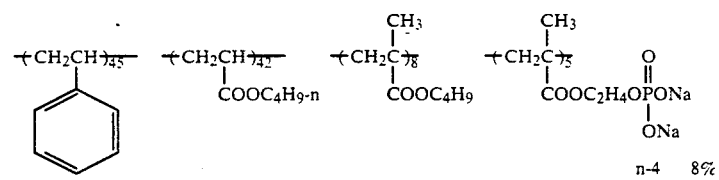
8.
n-4  8%
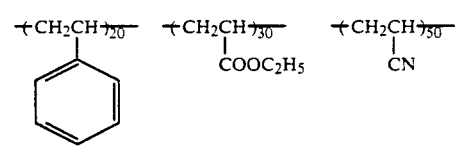
9.
a-10  10%
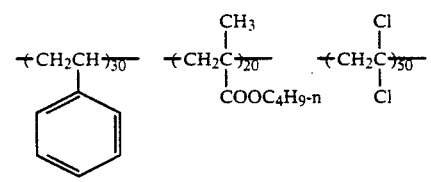
10.
a-2  3%
n-5  5%
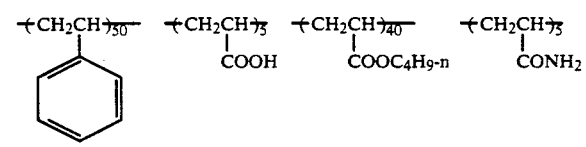
11.
n-2  5%
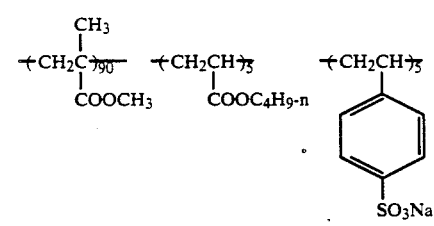
12.
n-2  5%
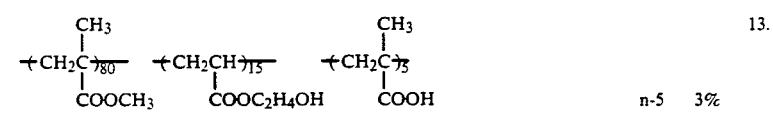
13.
n-5  3%

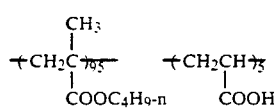

14.

n-2  5%

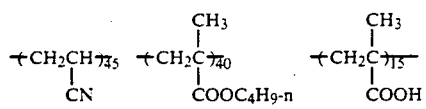

15.

n-8  1%

In the present invention, an electroconductive layer (antistatic layer) is formed on a transparent support by coating. As the transparent support, all supports for photography can be used, but preferably polyethylene terephthalate or cellulose triacetate prepared so as to transmit 90% or more of visible light.

These transparent supports can be prepared by the methods well known to those skilled in the art, but in some cases, a dye may be slightly added to give slight blue tint substantially without interfering with light transmission.

The support of the present invention may also have a subbing layer containing a latex polymer provided by coating after corona discharging treatment. The corona discharging treatment may be applied particularly preferably at 1 mW to 1 KW/m$^2$.min as the energy value. Also, particularly preferably, corona discharging treatment should be effected again before coating of the antistatic layer after coating of the latex subbing layer.

As the hardening agent for the antistatic layer of the present invention, a polyfunctional aziridine type compound is preferable. Particularly, a difunctional or trifunctional aziridine having a molecular weight of 600 or less is preferable.

The amounts of the water-soluble electroconductive polymer, hydrophobic polymer particles and hardening agent contained in the antistatic layer are preferably 30 to 95% by weight, 3 to 65% by weight and 2 to 50% by weight, respectively.

The electroconductive layer of the present invention may be on the support side relative to the photosensitive layer, or on the opposite side of the support relative to the light-sensitive layer, namely the back surface.

The present invention can be applied to substantially all light-sensitive materials formed on supports. For example, they are light-sensitive silver halide color materials, light-sensitive materials for roentgenogram, light-sensitive materials for printing plates, etc.

The silver halide emulsion to be used in the present invention can be stabilized by use of the compounds as disclosed in U.S. Pat. Nos. 2,444,607, 2,716,062 and 3,512,982, West Germany Patent Publications Nos. 1,189,380, 2,058,626, 2,118,411, Japanese Patent Publication No. 4133/1968, U.S. Pat. No. 3,342,596, Japanese Patent Publication No. 4417/1972, West Germany Patent Publication No. 2,149,789, Japanese Patent Publications Nos. 2825/1964 and 13566/1974, etc., preferably, for example, 5,6-trimethylene-7-hydroxy-S-triazolo(1,5-a)-pyrimidine, 5,6-tetramethylene-7-hydroxy-S-triazolo(1,5-a)-pyrimidine, 5-methyl-7-hydroxy-S-triazolo(1,5-a)-pyrimidine, 5-methyl-7-hydroxy-S-triazolo(1,5-a)-pyrimidine, 7-hydroxy-S-triazolone(1,5-a)pyrimidine, 5-methyl-6-bromo-7-hydroxy-S-triazolo(1,5-a)pyrimidine, gallic acid esters (e.g. isoamyl gallate, dodecyl gallate, propyl gallate and sodium gallate), mercaptans (e.g. 1-phenyl-5-mercaptotetrazole and 2-mercaptobenzthiazole), benzotriazoles (e.g. 5-bromobenztriazole, 5-methylbenztriazole), benzimidazoles (e.g. 6-nitrobenzimidazole), etc.

In the light-sensitive silver halide photographic material according to the present invention and/or the developer, an amino compound can be contained.

For enhancing developability, a developing agent such as phenidone or hydroquinone, and an inhibitor such as benzotri-azole can be contained on the emulsion side.

Alternatively, for enhancing the processing ability of the processing solution, a developing agent or an inhibitor can be contained in the backing layer.

The hydrophilic colloid to be used advantageously in the prevent invention is gelatin.

The gelatin to be used in the present invention may include both of alkali treated and acidic treated gelatins. When an ossein gelatin is used, it is preferable to remove calcium or iron component. Calcium component is preferably contained in an amount of 1 to 999 ppm, further preferably 1 to 500 ppm. Iron component is preferably contained in an amount of 0.01 to 50 ppm, further preferably 0.1 to 10 ppm. The method for controlling the employed amount of the calcium and iron components may be accomplished by passing aqueous gelatin solution through an ion exchange apparatus.

Developing agents used for processing the light-sensitive silver halide photographic materials may include catechol, pyrogalol and their derivatives, ascorbic acid, chlorohydroquinone, bromohydroquinone, methylhydroquinone, 2,3-dibromohydroquinone, 2,5-diethylhydroquinone, catechol, 4-chlorocatechol, 4-phenyl-catechol, 3-methoxy-catechol, 4-acetyl-pyrogallol, sodium ascorbic acid, etc.

As the HO—(CH=CH)$_n$—NH$_2$ type developing agent, typical example is ortho- and para- aminophenol, for example, 4-aminophenol, 2-amino-6-phenylphenol, 2-amino-4-chloro-6-phenylphenol, N-methyl-p-aminophenol, etc.

Furthermore, H$_2$N—(CH=CH)$_n$—NH$_2$ type developing agent may include, for example, 4-amino-2-methyl-N,N-diethylaniline, 2,4-diamino-N,N-diethylaniline, N-(4-amino-3-methylphenyl)-morpholine, p-phenylendiamine, etc.

As a hetero ring type developing agent, there may be included 3-pyrazolidones such as 1-phenyl-3-pyrazolidone, 1-phenyl-4,4-dimethyl-3-pyrazolidone and 1-phenyl-4-methyl-4-hydroxymethyl-3-pyrazolidone, 1-phenyl-4-amino-5-pyrazolone, 5-aminolaucyl, etc.

There may be effectively used the developers as described in T. H. James, "The Theory of the Photographic Process", Fourth Edition, pp. 291–334 and Journal of the American Chemical Society, vol. 73, pp. 3,100 (1951). These developers can be used either singly or in combination of two or more kinds, but preferably in combination of two or more kinds. Also, in the developer to be used for developing of the light-sensitive material according to the present invention, for example, sulfites such as sodium sulfite, potassium sulfite, etc. can be used as the preservative without impairing the effect of the present invention. Also, as the preservative, hydroxylamine and hydrazide compounds can be used, and in this case, the amount of such compound used may be preferably 5 to 500 g, more preferably 20 to 200 g per liter of the developer.

Also, in the developer, glycols may be contained as an organic solvent, and examples of such glycols may include ethylene glycol, diethylene glycol, propylene glycol, triethylene glycol, 1,4-butanediol, 1,5-pentenediol, etc., but diethylene glycol may be preferably used. The amount of these glycols used may be preferably 5 to 500 g, more preferably 20 to 200 g per liter of the developer. These organic solvents can be used either alone or in combination.

The light-sensitive silver halide photographic material can give a light-sensitive material extremely excellent in storage stability by performing developing processing by use of a developer containing a developing inhibitor as described above.

The pH value of the developer comprising the above composition may be preferably 9 to 13, but the pH value may be more preferably 10 to 12 in preservability and photographic characteristics. As for the cations in the developer, a developer with higher potassium ion ratio than sodium ion is preferable for enhancing the activity of the developer.

The light-sensitive silver halide photographic material according to the present invention can be processed according to various conditions. The processing temperature may be a developing temperature of 50° C. or lower, particularly around 25° C. to 40° C., and the developing should be generally accomplished within 2 minutes, particularly preferably from 10 seconds to 50 seconds to bring about preferable effects. Also, other processing steps than developing, for example, water washing, stopping, stabilizing and fixing, further, if necessary, pre-film hardening, neutralization, etc. can be employed as desired, and these can be also omitted suitably. Further, these treatments may be also the so-called manual developing processing such as dish developing, frame developing, etc., or mechanical developing such as roller developing, hanger developing, etc.

The present invention is described in detail by referring to examples. As a matter of course, the present invention is not limited by the examples as described below at all.

EXAMPLE 1

After a polyethylene terephthalate applied with subbing treatment was subjected to corona discharging, an antistatic solution having the constitution shown below was coated by use of an air knife coater at a speed of 33 m/min to 10 mg/dm².

| Water-soluble electroconductive polymer (A) | 6 g/l |
| Hydrophobic polymer particles of the present invention (B) (average particle size was set to 0.07 μ) | 4 g/l |
| Film hardener (H) | 1.5 g/l |

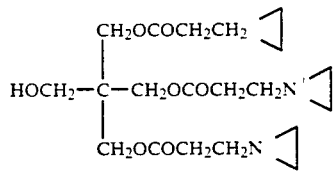

The coating was dried at 90° C. for 2 minutes, followed by heat treatment at 140° C. for 90 seconds. On the antistatic layer, gelatin was coated to 2.0 g/m², and haze test was conducted. As the film hardener of gelatin, 2,4-dichloro-6-hydroxy-S-triazine sodium was employed. The results are shown in Table 1.

Respective test methods are shown below.

(1) Adhesive force test

<Dry adhesion test>

On the surface of a backing layer of a sample, slight scratches were marked in a cross-cut pattern by use of a razor. A cellophane adhesive tape was pressed thereon, and quickly peeled off. The remaining ratio of the backing layer to adhesion area of the cellophane tape after peeling off is shown by percentage.

<Treated adhesion test>

On a backing layer of a sample, scratches were marked in a cross-cut pattern by a sharp point like a gimlet in a treating bath. The remaining ratio of the backing layer after the surface was rubbed is shown by percentage. In practical use, there is no problem if the percentage is not less than 80%.

(2) Haze test

By means of a turbidimeter Model T-2600 DA manufactured by Tokyo Denshoku K.K., the film support was measured and the transmittance was represented in %. The results are shown in Table 1.

TABLE 1

| Support Sample No. | (A) | (B) | Haze (%) |
| --- | --- | --- | --- |
| 1 (This inv.) | (4) | (3) | 0.8 |
| 2 (This inv.) | (4) | (6) | 0.8 |
| 3 (This inv.) | (14) | (12) | 0.7 |
| 4 (This inv.) | (23) | (14) | 0.7 |
| 5 (Comparative) | (4) | (a)* | 1.1 |

Note:
*Formula (a) Compound disclosed in Japanese Unexamined Patent Publication No. 84658/1980 (employed $C_{12}H_{26}SO_3Na$)

From the result of Table-1, it is apparent that the sample of the present invention is superior in haze to the comparative samples.

EXAMPLE 2

Under acidic atmosphere of pH 3.0, particles containing $10^{-5}$ mole of rhodium per one mole of silver were prepared according to the control double jet method. The particles were grown in a system containing 30 mg of benzyladenine per one liter of an aqueous 1% gelatin. After mixing of silver and the halide, 600 mg of 6-methyl-4-hydroxy-1,3,3a,7-tetrazaindene was added per 1 mole of silver halide, followed by washing with water and desalting.

Subsequently, 60 mg of 6-methyl-4-hydroxy-1,3,3a,7-tetrazaindene was added per one mole of silver halide, followed by sulfur sensitization. After sulfur sensitization, 6-methyl-4-hydroxy-1,3-3a,7-tetrazaindene was added as the stabilizer.

(Silver halide emulsion layer)

To the above respective emulsions, the following additives were added by controlling the attached amounts to those shown below, and each mixture was coated on a polyethylene terephthalate support subjected to poly(vinylidene chloride-itaconic acid) latex subbing treatment (100 μm thickness).

| | |
|---|---|
| Latex polymer: styrene-butyl acrylate-acrylic acid ternary copolymer | 1.0 g/m² |
| Tetraphenylphosphonium chloride | 30 mg/m² |
| Saponin | 200 mg/m² |
| Polyethylene glycol | 100 mg/m² |
| Sodium dodecylbenzenesulfonate | 100 mg/m² |
| Hydroquinone | 200 mg/m² |
| Phenidone | 100 mg/m² |
| Sodium styrenesulfonate-maleic acid copolymer (Mw = 250,000) | 200 mg/m² |
| Butyl gallate | 500 mg/m² |
| Hydrazine compound (shown below) | 20 mg/m² |
| 5-Methylbenzotriazole | 30 mg/m² |
| 2-Mercaptobenzimidazole-5-sulfonic acid | 30 mg/m² |
| Inert ossein gelatin (isoelectric point 4.9) | 1.5 mg/m² |
| 1-(p-acetylamidophenyl)-5-mercaptotetrazole | 30 mg/m² |
| Silver quantity | 2.8 g/m² |

Hydrazine compound

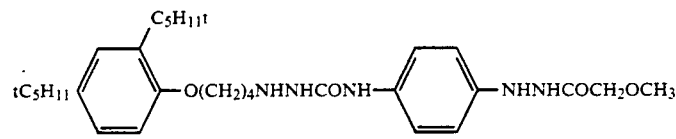

(Emulsion layer protective film)

As the emulsion layer protective layer, the composition was prepared to the attached amounts shown below.

| | |
|---|---|
| Fluorinated dioctylsulfosuccinic acid ester | 300 mg/m² |
| Matte agent: polymethyl methacrylate (average particle size 3.5 μm) | 100 mg/m² |
| Lithium nitrate | 30 mg/m² |
| Acid-treated gelatin (isoelectric point 7.0) | 1.2 g/m² |
| Colloidal silica | 50 mg/m² |
| Sodium styrenesulfonate-maleic acid copolymer | 100 mg/m² |
| Mordant: | 400 mg/m² |

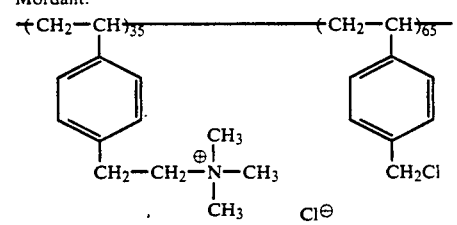

Dye: 200 mg/m²

(chemical structure of dye)

(Backing layer)

On the support on the opposite side to the emulsion layer, after previous corona discharging with a power of 30 W/m²·min., a poly(vinylydene chloride-itaconic acid) latex polymer was coated in the presence of hexamethyleneaziridine film hardener, and further the antistatic layer of the present invention with the composition shown in Table 2 was provided by coating thereon in the same manner as in Example 1. Subsequently, a backing layer containing a backing dye having the composition shown below was coated on the layer. The gelatin layer was hardened with glyoxal and 1-oxy-3,5-dichloro-S-triazine sodium salt.

| | |
|---|---|
| Hydroquinone | 100 mg/m² |
| Phenidone | 30 mg/m² |
| Latex polymer: butyl acrylate-styrene copolymer | 0.5 g/m² |
| Styrene-maleic acid copolymer | 100 mg/m² |
| Citric acid | 40 mg/m² |
| Benzotriazole | 100 mg/m² |
| Styrenesulfonate-maleic acid copolymer | 200 mg/m² |
| Lithium nitrate | 30 mg/m² |
| Backing dyes (a), (b) and (c) | (the employed amounts are shown below) |
| ossein gelatin | 2.0 g/m² |

Backing dye (a)  40 mg/m²

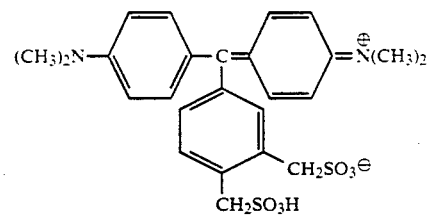

Backing dye (b)  30 mg/m²

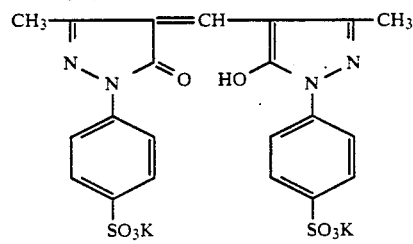

Backing dye (c)  30 mg/m²

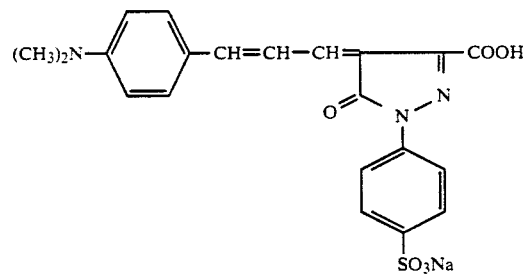

The sample obtained as described above were subjected to whole surface exposure, and developed by use of the developing solution and the fixing solution shown below, followed by haze test and adhesion test.

<Developing solution recipe>

| Hydroquinone | 25 g |
|---|---|
| 1-Phenyl-4,4-dimethyl-3-pyrazolidone | 0.4 g |
| Sodium bromide | 3 g |
| 5-Methylbenzotriazole | 0.3 g |
| 5-Nitroindazole | 0.05 g |
| Diethylaminopropane-1,2-diol | 10 g |
| Potassium sulfite | 90 g |
| Sodium 5-sulfosalicylate | 75 g |
| Sodium ethylenediaminetetraacetate | 2 g |
| (made up to one liter with water, pH was adjusted to 11.5 with caustic soda) | |

<Fixing solution recipe>

| [Composition A] | |
|---|---|
| Ammonium thiosulfate (72.5 wt. % aqueous solution) | 240 ml |
| Sodium sulfite | 17 g |
| Sodium acetate.trihydrate | 6.5 g |
| Boric acid | 6 g |
| Sodium citrate.dihydrate | 2 g |
| Acetic acid (90 wt. % aqueous solution) | 13.6 ml |
| [Composition B] | |
| Pure water (deionized water) | 17 ml |
| Sulfuric acid (50 wt. % aqueous solution) | 3.0 g |
| Aluminum sulfate (aqueous solution containing | 20 g |
| 8.1 wt. % content calculated on Al₂O₃) | |

During use of the fixing solution, the above composition A and the composition B were dissolved in 500 ml of water in this order, and made up to one liter before use. The fixing solution had a pH of about 5.6.

<Developing processing conditions>

| (Step) | (Temperature) | (Time) |
|---|---|---|
| Developing | 40° C. | 8 sec. |
| Fixing | 35° C. | 8 sec. |
| Water washing | Normal temperature | 10 sec. |

Evaluation was performed as described below, and the results are shown in Table 2.

TABLE 2

| Support Sample No. | (A) | (B) | Haze (%) | Treated adhesion test (%) | Dry adhesion test (%) |
|---|---|---|---|---|---|
| 6 (Inv.) | (4) | (3) | 0.8 | 90 | 90 |
| 7 (Inv.) | (4) | (6) | 0.8 | 95 | 90 |
| 8 (Inv.) | (14) | (12) | 0.7 | 90 | 90 |
| 9 (Inv.) | (23) | (13) | 0.8 | 95 | 90 |
| 10 (Comp.) | (4) | (a) | 1.1 | 75 | 70 |

From the results of Table 2, the samples of the present invention show good film adhesion similarly to Example 1 and no deterioration even after treatment, and further good haze.

According to the present invention, a light-sensitive silver halide photographic material excellent in transparency, which does not cause deterioration in antistatic performance after development processing could be obtained.

We claim:

1. A plastic film comprising a transparent support having an antistatic layer provided thereon, said antistatic layer consisting essentially of
   (1) a reaction product of a water-soluble electroconductive polymer, having at least one electroconductive group selected from the group consisting of sulfonic acid, sulfuric acid esters, quaternary ammonium salts, tertiary ammonium salts, carboxyl, polyethylene oxide, hydroxy, amino, epoxy, aziridine, active methylene, sulfinic acid, aldehyde, and vinylsulfone;
   (2) hydrophobic polymer particles, and
   (3) a hardening agent, wherein said hydrophobic polymer particles are stabilized by
   (4) a surfactant having at least 5 ethylene oxide chains, said surfactant being at least one compound selected from the group consisting of compounds represented by Formulas (I), (II), (III), (IV), (V), and (VI)

Formula (I)

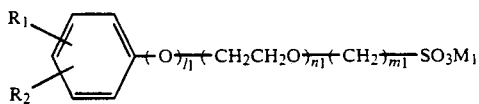

wherein $R_1$ represents an alkyl group having 1 to 18 carbon atoms, $R_2$ represents a hydrogen atom or an alkyl group having 1 to 18 carbon atoms, $l_1$ represents an integer of 0 or 1, $n_1$ represents an integer of 5 to 50, $m_1$ represents an integer of 0 to 4, and $M_1$ represents a cation of an alkali metal ion, alkaline earth metal ion, ammonium ion or quarternary ammonium salt ion, Formula (II)

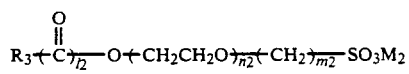

wherein $R_3$ represents an alkyl group or an alkenyl group having 6 to 20 carbon atoms, $l_2$ represents 0 or 1, $n_2$ represents an integer of 0 to 4, and $M_2$ has the same meaning of $M_1$ of Formula (I), Formula (III)

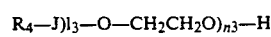

wherein $R_4$ represents an alkyl group or an alkenyl group having 6 to 20 carbon atoms, J represents

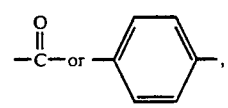

$l_3$ represents 0 or 1, and $n_3$ represents an integer of 5 to 40,

Formula (IV)

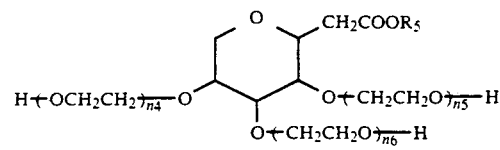

wherein $R_5$ represents an alkyl group or an alkenyl group having 8 to 25 carbon atoms and the total of $n_4$, $n_5$ and $n_6$ represents an integer of 5 to 100, with the proviso that at least one of $n_4$, $n_5$ and $n_6$ is 5 or more, Formula (V)

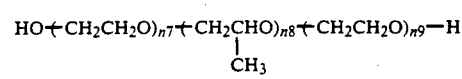

wherein the total of $n_7$ and $n_9$ denotes an integer of 5 to 100, and $n_8$ denotes an integer of 1 to 50, with the proviso that at least one of $n_7$ and $n_9$ is 5 or more, Formula (VI)

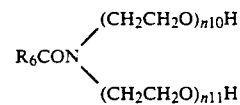

wherein $R_6$ represents an alkyl group or an alkenyl group having 6 to 20 carbon atoms, $n_{10}$ and $n_{11}$ represents an integer of 5 to 100, with the proviso that at least one of $n_{10}$ and $n_{11}$ is 5 or more.

2. The plastic film according to claim 1, wherein the electroconductive group is contained in an amount of 5% by weight or more per one molecule of the water-soluble electroconductive polymer.

3. The plastic film according to claim 1, wherein the water-soluble electroconductive polymer has a molecular weight of 3,000 to 100,000.

4. The plastic film according to claim 3, wherein the water-soluble electroconductive polymer has a molecular weight of 3,500 to 50,000.

5. The plastic film according to claim 1, wherein the hydrophobic polymer is a polymer obtained from at least one monomer selected from the group consisting of styrene, styrene derivatives, alkyl acrylates, alkyl methacrylates, olefin derivatives, halogenated ethylene derivatives, acrylamide derivatives, methacrylamide derivatives, vinyl ester derivatives and acrylonitrile.

6. The plastic film according to claim 5, wherein the hydrophobic polymer is a polymer containing styrene derivatives, alkyl acrylates and alkyl methacrylates in an amount of at least 30 mole %.

7. The plastic film according to claim 1, wherein the surfactant having at least five ethylene oxide chains is contained in an amount of not less than 0.5% by weight and not more than 20% by weight to a polymer constituting the hydrophobic polymer particles.

8. The plastic film according to claim 1, wherein the surfactant having at least five ethylene oxide chains is contained in an amount of not less than 1% by weight and not more than 10% by weight to a polymer constituting the hydrophobic polymer particles.

9. The plastic film according to claim 1, wherein a dry thickness of the antistatic layer is 0.01 μm or more.

10. The plastic film according to claim 1, wherein a dry thickness of the antistatic layer is 0.05 to 0.5 μm.

11. The plastic film according to claim 1, wherein the average particle size of the hydrophobic polymer particles is 0.005 to 0.5 μm.

12. The plastic film according to claim 1, wherein the average particle size of the hydrophobic polymer particles is 0.025 to 0.25 μm.

13. The plastic film according to claim 1, wherein the average particle size of the hydrophobic polymer particles is 0.03 to 0.2 μm.

14. The plastic film according to claim 1, wherein the molecular weight of the hydrophobic polymer constituting the hydrophilic polymer particles is 3,000 or higher.

15. The plastic film according to claim 1, wherein the support is a transparent support of polyetyhlene terephthalate or cellulose triacetate which transmit 90% or more of visible light.

16. The plastic film according to claim 1, wherein the hardening agent is a polyfunctional aziridine.

17. The plastic film according to claim 1, wherein the hardening agent is a difunctional or trifunctional aziridine having a molecular weight of 600 or less.

18. The plastic film according to claim 1, wherein the water-soluble electroconductive polymer, hydrophobic polymer particles and hardening agent are contained in the antistatic layer in an amounts of 30 to 95% by weight, 3 to 65% by weight and 2 to 50% by weight, respectively.

* * * * *